April 23, 1968     W. BERTRAM     3,379,109
AUTOMATIC CENTER SHUTTER FOR PHOTOGRAPHIC PURPOSES
Filed June 8, 1965     2 Sheets-Sheet 1

INVENTOR.
WILHELM BERTRAM
BY
Woodhams, Blanchard & Flynn
ATTORNEYS

April 23, 1968 W. BERTRAM 3,379,109
AUTOMATIC CENTER SHUTTER FOR PHOTOGRAPHIC PURPOSES
Filed June 8, 1965 2 Sheets-Sheet 2

INVENTOR.
WILHELM BERTRAM
BY
ATTORNEYS

United States Patent Office 3,379,109
Patented Apr. 23, 1968

3,379,109
AUTOMATIC CENTER SHUTTER FOR
PHOTOGRAPHIC PURPOSES
Wilhelm Bertram, Munich-Grafelfing, Germany, assignor to Ernst & Wilhelm Bertram, Munich-Pasing, Germany
Filed June 8, 1965, Ser. No. 462,302
Claims priority, application Germany, June 11, 1964,
B 77,208
7 Claims. (Cl. 95—62)

ABSTRACT OF THE DISCLOSURE

A shutter control mechanism wherein the opening and closing movement of the shutter blades is controlled by means of a toggle device. The toggle device consists of driving and driven levers having a one-way drive coupling therebetween. The toggle device is positionable in either a rest or a release position, in which positions the levers are oppositely inclined relative to one another. In either of these positions, the shutter blades are in the closed position. Movement of the toggle device from the release position toward the rest position causes the levers to become aligned in an intermediate position wherein the shutter blades are open. During return movement of the driving lever from the rest position to the release position, the coupling between the driving lever and the driven lever is disconnected whereby the shutter remains closed.

---

Figure 1:
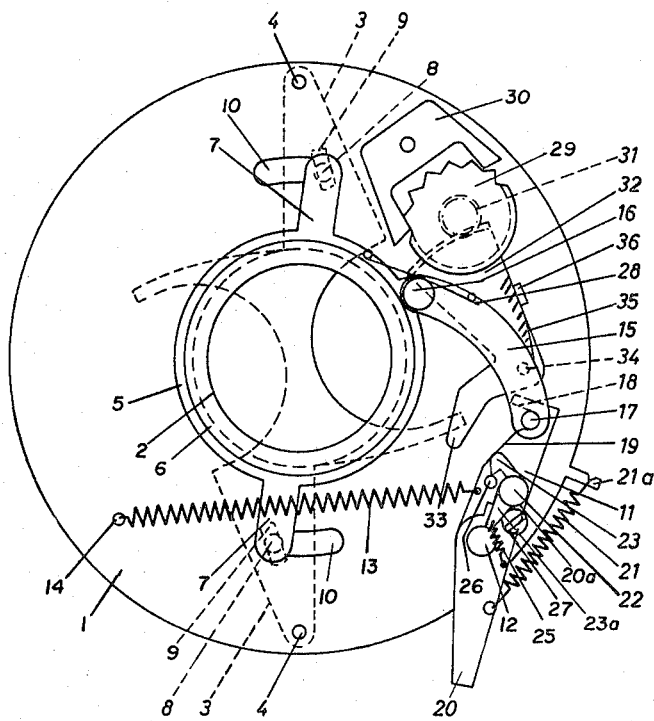

The invention concerns a self-energizing center shutter for photographic purposes in which the opening and closing movement of pivotally mounted shutter plates is brought about through back and forth operating parts for suitable lamellae. A lever driving apparatus is connected to said lamellae and includes a drive lever which is actuated by means of a spring energized tension-and-release lever, is swingable against spring pressure out of a position of rest into a release position and in which the tension-and-release lever then separates from the drive lever.

In known self-energizing center shutters of this type, there have been utilized drive means rotatably mounted and movably connected with the lamellae driving parts. Such drive means has a one-way catch and is tensioned by a return spring. Where the drive lever is pivoted out of the rest position into the release position by means of the tension-and-release lever, it slides past the one-way catch so that the shutter lamellae can be held in the closed position by the return spring engaging the drive means. Upon its return movement, and after separation from the tension-and-release lever, the drive lever strikes against the one-way catch and carries this and the drive means against the force of the return spring into the rest position.

In this manner, the shutter lamellae are swung into the open position. Shortly before reaching the rest position, the drive lever comes free from the one-way catch so that the return spring rotates the drive means in a return direction and thereby closes the shutter lamellae.

As apparent from the above, the shutter operating movement in the previously known self-energizing central shutter operating mechanism is definitely limited. In this first phase, the shutter is opened by a spring connected to the driving lever. In the second phase, the shutter is closed by another spring, namely, a return spring, also engaging the drive means. On account of unavoidable spring drag, the shutter speed obtainable by such a two-phase shutter operating mechanism is definitely limited. In this arrangement, a returning drive lever often cannot avoid striking the catch of the drive means with a substantial blow whereby there occurs both a violent shock to the shutter and excessive or undesired amount of noise. Finally, a rotatable drive means which must have a movable connection with the lamellae driving means requires further structural parts which are not desirable, both because of expense and because of the narrow space available in the shutter housing. Because of this, self-tensioning shutters are today utilized only for special cameras and in other cameras the tensioning and release of such shutters are carried out by means of separate operating devices.

There are, indeed, already known center shutter constructions in which an annularly constructed operating device for the opening and closing of the shutter is operated with an oscillating motion through a drive linkage. This drive linkage is driven through spring force by rotation of adjustable driving means and operates for both opening and closing of the shutter upon rotation of the driving means in the same rotative sense so that the separation of the shutter operation into two phase is not required. In this shutter, a drive lever engages the driving means and, separately therefrom, it engages also a release lever so that it does not constitute a self-tensioning central shutter. The shutter must usually be first tensioned in a known manner and then be released through further hand operated means. The separate operating and translation means for cocking and releasing of the shutter require, as in all nonself-cocking shutters, a proportionately large space. This is because in this shutter the driving part must act through the rotation of 360° for carrying out a shutter operation. The driving linkage rotates through a corresponding extent and requires thereby still further space.

The purpose of the invention is to provide a self-tensioning central shutter of the above-described type which can be built very simply but will be capable of a high shutter speed. According to the invention, the drive lever, together with a pivoted lever which is linked to the lamellae operating parts, constitutes a knuckle lever which through spring force engaging the drive lever is movable away from the bent out position, corresponding to the release condition, past the extended position into an inwardly bent position, corresponding to a position of rest, and is also movable by means of the tensioning-and-release lever out of the inwardly bent position to the outwardly bent position. The purposes of the invention are further accomplished in that the knuckle linkage is closed upon movement thereof out of the outwardly bent position into the inwardly bent position and an automatic releasing of the inward movement coupling between the driving and pivoted lever is obtained upon movement from the inwardly bent position to the outwardly bent position.

In the self-tensioning shutter according to the invention, the drive lever returning out of the release position urges the pivoted lever in one translative direction until it arrives at the point where it and the drive lever together extend in a straight line, and then in the opposite translative direction draws it backwardly until it arrives at the position of rest. The pivoted lever, accordingly, acts under the force of a single spring during the movement of the drive lever in one direction to bring about a back and forth movement which is transmitted to the lamellae actuating parts so that the shutter is opened and closed in a single motion. In consequence of the manner of operation of the shutter means, the central shutter according to the invention attains an appreciably shorter shutter opening time and a more useable shutter opening pattern than with the self-tensioning shutters known up to this time. Since, during a normal shutter operation, all of the parts of the shutter which take part in the shutter movement are connected together, there occur no sudden contacts or striking between the parts so a shutter according to the invention is shock free, creates only a small amount of noise and operates with a minimum of wear. The drive mechanism for driving of the lamellae operating parts is very simply built so that the shutter is inexpensive to manufacture and requires only a small space for installation. A shutter according to the invention can therefore be utilized in inexpensive cameras and will require a relatively small amount of space for installation. The fact that the path of movement of the knuckle lever is very small further contributes to the small space requirement of the shutter according to this invention. In no case does the zone of movement of the shutter lever extend through an angle of more than 90°.

An especially simple form of the inward-movement catch is accomplished in an advantageous embodiment of the invention in that one of the driving and pivoted levers carries a pin and the other is provided with an open side constituting a gripping mouth, is further accomplished in that the catch pin is received into the mouth upon movement of the knuckle lever out of the outwardly bent into the inwardly bent position and leaves the gripping mouth upon movement of same from the inwardly bent to the outwardly bent position and is further accomplished in that the link pin is held by spring pressure in position constantly against an edge leading to said gripping mouth. By this construction of the one-way coupling, the parts remain constantly in a positive relationship so that in no phase of movement of the knuckle lever is here any separation between them. No appreciable wear can therefore occur.

In the known center shutters, the tensioning-and-release lever and the drive lever are mounted pivotally on different axes. The connection between the tensioning-and-release lever and the drive lever is provided through a pivoted cam mounted on the axis of the drive lever, which upon tensioning and releasing of the shutter connects the tensioning-and-releasing lever movably with the drive lever and which can be released upon return movement of the tensioning-and-release lever into the position of rest.

According to one advantageous embodiment of the invention, there is obtained a supplemental advantage in that the drive lever and the tension-and-release lever are mounted pivotally on a common axis, in that one of the two levers carries stop means and the other a stop engaging means, and that a more effective means working with the stop device is provided for freeing of the stop in the release position. The tensioning-and-release lever on the one hand and the drive lever on the other hand provides in the above-referred-to embodiment of the shutter according to the invention a two-armed lever whose arms are connected solely with each other upon pivoting of same out of the position of rest into the release position, while they can pivot with relative respect to each other in the release position. In this manner, the tensioning-and-release lever separate from the drive lever becomes unnecessary so that these elements can be constructed in a close relationship. Further, this saves one rotative axis which makes easier the operation of the shutter.

One simple and yet reliable releasable connection between the two levers may be obtained if the stop means is constructed as a spring-tensioned gripping means pivotally mounted on the appropriate lever and if the part cooperating therewith is constructed as a link pin. The means operating as a release device is desirably constructed as an eccentrically mounted pin. By means of this pin, the point at which the release operation is initiated is very readily adjusted.

The shutter according to the invention will also provide very easily obtained adjustability for different shutter opening times. For this purpose, according to the above-referred-to embodiments of the invention there is placed in the path of a catch movably mounted on the knuckle lever, an arm of a drive means for a retarding device and said arm being adjustable by means of an adjustment cam for controlling shutter time. Thus, insofar as the catch mounted on the knuckle lever controls the arm of the drive mechanism, the shutter operation can be adjusted for different periods of operation.

If it is desired to provide no separate catch, it is possible to construct the knuckle lever pin as a catch.

Figure 2:
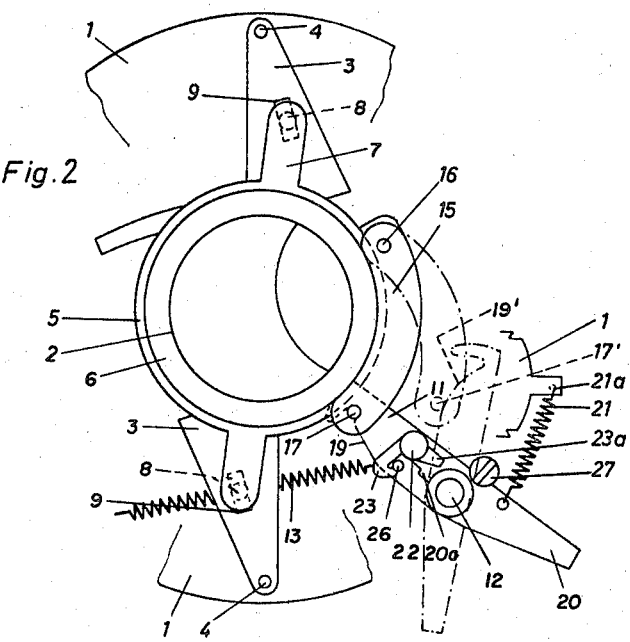
Figure 3:
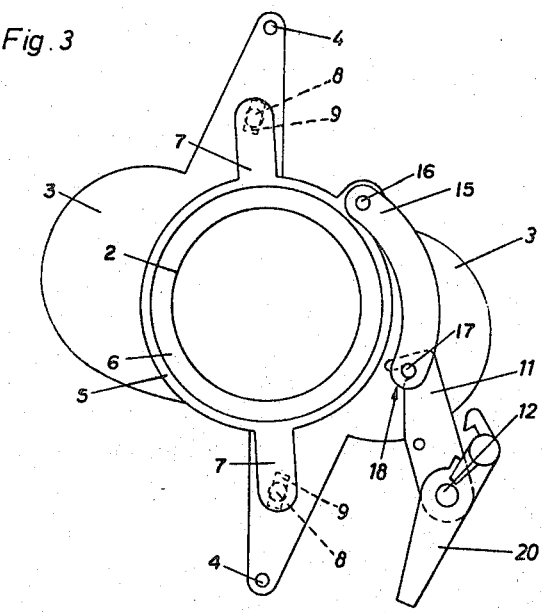

One preferred embodiment of the invention is set forth in the drawings. The drawings show:

FIGURE 1, a schematic illustration of a shutter according to the invention in released position;

FIGURE 2, an illustration corresponding to FIGURE 1 of the shutter in the rest position and in an intermediate position wherein several parts are omitted for clarity; and FIGURE 3, an illustration of a shutter in open position, likewise omitting several parts.

In the drawings there is shown a base plate 1 of a shutter housing which contains the central light admitting opening 2. On the base plate 1, the shutter lamellae 3 are mounted for pivotal movement around the fixed pins 4. A lamellae operating apparatus is provided for the pivoting of the shutter lamellae out of the closed position into the open position and return, which operating mechanism is illustrated in the illustrated embodiment as a drive ring 5. The drive ring 5 is rotatably mounted on the plate 1 around the flange 6 which in turn surrounds the aperture 2. Said drive ring 5 has two arms 7 lying diametrically opposite each other which are connected fixedly with the pins 8 extending into the slots 9 of the shutter lamellae 3. These pins project into the arcuate slits 10 of the base plate 1.

For the rotation of the driving ring 5 there is provided a drive means including a drive lever 11. The drive lever 11 is mounted pivotally on a rotative axis 12 in the base plate 1 and is tensioned by a drive spring 13 which engages the base plate 1 with one end and the drive lever 11 with the other end. The drive lever 11 comprises together with the pivoted lever 15 a knuckle lever. The pivot lever 15 is at 16 pivotally connected to the drive ring 5 and carries a knuckle linking pin 17 at the other end. The pin 17 operates in cooperation with the mouth 18 on the adjacent end of the drive lever 11 as well as with a curved edge 19 leading into the mouth 18. The mouth 18 and the curved edge 19 are so constructed that the knuckle linkage between the levers 11 and 15 constitute a one-way coupling which is closed upon the inward urging of the knuckle lever structure out of the position shown in FIGURE 1 across the straight line position shown in FIGURE 3 and into position shown in solid lines in FIGURE 2, while upon pivoting of the knuckle lever in the opposite direction the coupling is automatically opened for the moving of the pin 17 out of the mouth 18.

Further, a tensioning-and-release lever 20 is movably mounted around the axis 12, said lever being tensioned by a spring 21 which on one end is hooked to projection 21A on the base plate 1, and on the other side engages the tension-and-release lever 20. A gripping link 23 is pivotally mounted around a pin 22 at the forward end 20a of the lever 20. The keeper 23 has an angular arm 23A and is tensioned by means of a spring 25 in a counterclockwise direction as appearing in the drawings, said keeper being responsive on the one hand to the tension-and-release lever 20 and on the other hand to the angular arm 23A. The keeper 23 cooperates with the stop pin 26 on the drive lever 11. Eccentric pin 27 is rotatably mounted on the base plate 1 for releasing the keeper 23 from the stop pin 26.

The manner of operation of the shutter described up to this point is as follows: In rest position the parts are in the position of FIGURE 2 as set forth in solid lines. The knuckle lever parts 11, 15 are in the inwardly bent position. The pin 17 lies in the mouth 18 of the drive lever 11. The shutter lamellae 3 are pivoted to a position in front of the aperture so that the shutter is closed. The keeper 23 engages the pin 26 under pressure of the spring 25 (not shown in FIGURE 2) so that levers 11 and 20 constitute a single unit.

For tensioning and releasing the shutter, it is necessary that the tension-release lever 20 be directly or indirectly operated that it rotates in a clockwise direction around the axis 12. The drive lever 11 will in this manner be carried by the keeper 23 in the same direction against the force of the spring 13. The pin 17 at the beginning of the movement rises first out of the mouth 18 and slides along the profiled edge 19. The lever 11, 15 then occupies a position set forth in broken lines in FIGURE 2 whereby the pivoted lever 15, under the urging of the spring 28 follows the drive lever 11 in such a manner that the pin 17 remains in position on the profiled edge 19. This is made clear by the middle position illustrated by broken lines in FIGURE 2. The pin 17 shown therein lies outwardly of the mouth 18 in the drive lever 11 and against the profile edge 19. In this movement, the pivoted lever 15 pivots only around the pivot pin 16. It finally stops so that it does not also move the drive ring 5. The shutter lamellae 3 remain accordingly in a closed position.

As soon as the lever 15 and 16 reaches the outwardly bent position shown in FIGURE 1, the pin 17 is again engaged in the mouth 18. At this point, the angle arm 23A of the keeper 23 comes into contact with the eccentric pin 27. The keeper 23 becomes thereby released and the stop pin 26 is freed. Now under the urging of the spring 13 the drive lever 11 pivots around the axis 12 in a counterclockwise direction. The pin 17 remains held during this movement in the mouth 18 so that the knuckle lever 11, 15 returns across the straight position shown in FIGURE 3 into the inwardly bent position shown in FIGURE 2. The pivoting movement of the drive lever 11 brings about the pivotal and translative movement of the pivot lever 15. The pivot pin 16 is first urged upwardly upon movement of the knuckle lever from the outward position into the straight position of the drawing and the drive ring partially rotated thereby. On its further movement from the straight position into the inwardly bent position, said pin 16 is again drawn downwardly and a reverse rotation imparted thereby to the drive ring 5. The drive ring 5 thus goes through an oscillating movement during the course of the return pivoted movement of the drive lever 11 while the pins 8 mounted on the arm 7 are moved in the slot 9 of the shutter lamellae 5. Upon the initial rotation of the drive ring 5 in a counterclockwise direction, these lamellae are swung around the pin 4 and thereby move out of the closed position of FIGURE 1 and into the open position of FIGURE 3. Upon the immediately subsequent return movement of the drive ring 5 in a clockwise direction, the shutter lamellae are again returned into the closed position. The tensioning-and-release lever 20 will be released after the release of the shutter and retruned into the position of FIGURE 2 under the urging of spring 21. The keeper 23, because of its slanting surface provided on its outer side re-engages the pin 26 so that the shutter is ready for the next operation.

The path of the knuckle lever and the size of its parts are selected so that the desired opening pattern for the shutter can be obtained from the movement of the knuckle lever as described. The release point is adjusted by the eccentric pin 27.

The spring 13 is so dimensioned that it provides an opening time which, when the inward movement of the knuckle lever is unhindered, is the shortest open time attainable by a given shutter. In order to obtain a longer shutter open time, there is provided any convenient presently known retarding device which may consist of a restrictive wheel 29 and a ratchet 30 cooperating therewith coaxially with the restrictive wheel, and fixed with respect thereto, there is provided a pinion 31 with which the tooth sector 32 operates as the drive means for the retarding mechanism. The tooth sector 32 has an arm 33 and is mounted pivotally on axis 34. The arm 33 can be moved inwardly along the operating path of the pin 17. The place at which the arm 33 is located is dependent upon the adjustment of a shutter time cam 35 which, by the nose 36 carried on the tooth segment 32 controls the tooth segment and thereby the position of the arm 33. The more closely arm 33 lies to the release position of the pin 17, the longer the inward movement of the knuckle lever is delayed by means of the delay mechanism 29, 30 and vice versa. In this manner, different shutter opening times are obtained in a very simple manner.

The invention is not limited to the embodiments illustrated. Especially, the lamellae operating parts can have other forms. It is required only that the shutter lamellae be opened and closed by a back and forth moving part. Further, the one-way coupling located between levers 11 and 15 can be constructed in various ways. For example, the mouth 18 can also be provided on the lever 15 and the pin cooperating therewith on the lever 11. Further, the releasable apparatus between tension-and-release lever 20 and the drive lever 11 can be obtained through various other possible arresting and releasing devices. In place of the eccentric pin 27 there can be provided other adjustable devices, for example, an arresting screw. The pick-up for the arm 33 of the retarding device does not need to include the pin 17 even though this is a very simple way to do so. Basically, it is also possible in the broader concept of the invention to provide a separable catch for the lever 11 and 15. This can be selected as desired according to the position desired for the parts under given circumstances. It is also to be noted that the number of shutter lamellae can be as large as desired. For example, without anything further, three or five lamellae can be operated from the drive ring 5.

All the features set forth in the description and drawings can also be put together in other combinations according to the purposes of the invention.

The embodiments of the invention in which an exclusive property or privilege is claimed are defined as follows:

1. A shutter construction comprising:
   a plurality of shutter blades pivotally mounted for relative movement between open and closed positions;
   drive means connected to said blades for controlling opening and closing movement thereof;
   toggle means connected to said drive means for actuating same, said toggle means comprising a drive lever and an actuating member, said actuating member being pivotally connected to said drive means;
   resilient means urging said drive lever from a release position toward a rest position;
   coupling means adapted to interconnect said drive lever and said actuating member, movement of said drive lever from the release position to the rest position causing said drive lever to positively engage and drive the actuating member;
   said actuating member and drive lever being relatively angularly inclined in opposite directions when in the rest and release positions respectively, movement from said release position to said rest position causing said toggle means to pass through an intermediate position in which said drive member and actuating member are aligned;
   said shutter blades being in the closed position when said actuating member is in either the rest or release position, movement of said actuating member through the intermediate position toward the rest position causing said shutter blades to move to the open position;
   a pivotal release lever engageable with said drive lever for moving same from said rest position to said release position in opposition to said resilient means, said coupling means permitting said actuating member to be moved to the release position without actuating the drive means whereby said shutter blades remain in the closed position.

2. A shutter construction according to claim 1, wherein said coupling means comprises a one-way drive coupling and includes a toggle pin carried on one of the drive lever and actuating member and the other is provided with a slot extending inwardly from one edge thereof, said one edge having a profiled surface leading to said slot, said toggle pin being received within the slot when the toggle means is in the release position, said pin being retained in the slot as the toggle means moves from the release position to the rest position, return movement of the toggle means from the rest position to the release position causing the pin to be removed from said slot, and further including resilient means urging said actuating member in the return direction from the rest position to the release position whereby the toggle pin is held in engagement with the profiled surface.

3. A shutter construction according to claim 2, wherein the toggle pin is fixedly mounted on one end of the actuating member and the slot and profiled edge is provided on the drive lever.

4. A shutter construction according to claim 1, wherein the drive lever and the release lever are pivotally mounted about a common axis, stop means coacting between the levers for preventing relative rotation therebetween, said stop means including a fixed stop member on one of the levers and a movable stop member on the other lever, and fixed abutment means coacting with the movable stop member when the levers are in the release position for releasing the stop means so as to permit relative rotation to occur between said levers.

5. A shutter construction according to claim 4, wherein the fixed stop member comprises a latch pin and the movable stop member comprises a latch lever pivotally mounted on its respective lever, and spring means urging the latch lever into engagement with the latch pin.

6. A shutter construction according to claim 4, wherein the fixed abutment means comprises an eccentric pin which is rotatably adjustable for varying the release position.

7. A shutter construction according to claim 1, further including retarder means for delaying the movement of said toggle means from the release position to the rest position, said retarder means including an arm adjustably positioned in the path of movement of the toggle means for retarding the movement thereof, and adjustable cam means interconnected to the retarder arm for adjusting the position thereof to permit variation of the shutter opening time.

References Cited

UNITED STATES PATENTS

| | | | |
|---|---|---|---|
| 1,629,534 | 5/1927 | Riddell | 95—63 |
| 2,168,893 | 8/1939 | Aiken | 95—63 |
| 1,678,119 | 7/1928 | Klein | 95—63 |
| 2,295,812 | 9/1942 | Strassenburg | 95—62 |
| 2,816,494 | 12/1957 | Kaden | 95—62 |
| 2,869,446 | 1/1959 | Franceschini | 95—62 |
| 3,115,080 | 12/1963 | Kopp | 95—62 X |
| 3,223,015 | 12/1965 | Rentschler | 95—62 |
| 3,230,853 | 1/1966 | Durst | 95—62 |

JOHN M. HORAN, *Primary Examiner.*